United States Patent
Lee (10) Patent No.: US 9,463,409 B2
(45) Date of Patent: Oct. 11, 2016

(54) OIL MIST FILTER

(71) Applicant: Tung-Tsai Lee, Changhua Hsien (TW)

(72) Inventor: Tung-Tsai Lee, Changhua Hsien (TW)

( * ) Notice: Subject to any disclaimer, the term of this patent is extended or adjusted under 35 U.S.C. 154(b) by 0 days.

(21) Appl. No.: 14/634,684

(22) Filed: Feb. 27, 2015

(65) Prior Publication Data

US 2016/0250578 A1    Sep. 1, 2016

(51) Int. Cl.
*B01D 50/00* (2006.01)
*B01D 46/00* (2006.01)
*B01D 45/16* (2006.01)

(52) U.S. Cl.
CPC ............. *B01D 50/002* (2013.01); *B01D 45/16* (2013.01); *B01D 46/0002* (2013.01); *B01D 46/0023* (2013.01)

(58) Field of Classification Search
CPC ............ B01D 50/002; B01D 46/0002; B01D 46/0023; B01D 45/16
See application file for complete search history.

(56) References Cited

U.S. PATENT DOCUMENTS

| | | | | |
|---|---|---|---|---|
| 1,867,465 A | * | 7/1932 | Moynan | B01D 45/08 55/449 |
| 2,198,819 A | * | 4/1940 | Holm | B01D 29/0036 138/37 |
| 3,122,501 A | * | 2/1964 | Hultgren | B01D 29/114 210/444 |
| 4,082,071 A | * | 4/1978 | Jones | F01M 13/04 123/573 |
| 4,141,700 A | * | 2/1979 | Norton, Jr. | B01D 45/16 210/304 |

(Continued)

*Primary Examiner* — Amber R Orlando
*Assistant Examiner* — Britanny Precht (57) ABSTRACT

An oil mist filter is fixed on an air intake of an oil mist collector and contains: a top cover, a bottom cover, and a conical filtering assembly. The top cover includes a collection portion formed on a central position thereof and a plurality of guiding portions radially extending outward from the collection portion. The bottom cover is hollow and includes a through orifice defined on a central position thereof, and an outer diameter of the bottom cover is greater than the top cover. The filtering assembly is disposed between the top cover and the bottom cover. Thereby, oily substances from the top cover are guided by the plurality of guiding portions to flow through and to be filtered by the filtering assembly, and then the oily substances are guided out of the through orifice of the bottom cover.

17 Claims, 7 Drawing Sheets

(56) References Cited

U.S. PATENT DOCUMENTS

| | | | | | |
|---|---|---|---|---|---|
| 4,411,783 A * | 10/1983 | Dickens | A61M 1/3627 210/304 |
| 4,664,684 A * | 5/1987 | Dunn | B01D 46/2411 210/493.2 |
| 4,758,460 A * | 7/1988 | Spicer | B01D 39/14 427/244 |
| 4,865,635 A * | 9/1989 | Cuevas | B01D 39/2068 29/419.2 |
| 4,932,987 A * | 6/1990 | Molina | B01D 19/0031 210/304 |
| 5,785,850 A * | 7/1998 | Lynch | B01D 29/15 210/304 |
| 5,904,756 A * | 5/1999 | Fujii | B01D 46/0031 55/413 |
| 6,006,829 A * | 12/1999 | Whitlock | B01D 29/15 166/228 |
| 6,083,292 A * | 7/2000 | Fumagalli | A47L 9/1608 55/318 |
| 6,176,904 B1 * | 1/2001 | Gupta | A61M 1/3627 210/188 |
| 6,423,225 B2 * | 7/2002 | Wong | B01D 27/00 210/232 |
| 6,485,536 B1 * | 11/2002 | Masters | A47L 9/102 55/337 |
| 6,843,377 B1 * | 1/2005 | Roll | B01D 29/21 210/437 |
| 7,232,035 B1 * | 6/2007 | Crawford | B01D 27/00 210/232 |
| 7,771,595 B2 * | 8/2010 | Reynolds | B01D 29/21 210/232 |
| 7,878,299 B2 * | 2/2011 | Geyer, III | F01N 1/082 181/229 |
| 2003/0010002 A1 * | 1/2003 | Johnson | B01D 39/1623 55/486 |
| 2004/0083697 A1 * | 5/2004 | Niakin | B01D 39/083 55/486 |
| 2007/0175192 A1 * | 8/2007 | Niakan | B01D 46/521 55/486 |
| 2008/0152519 A1 * | 6/2008 | Chern | B01D 45/16 417/430 |
| 2011/0138757 A1 * | 6/2011 | Chen | B01D 45/14 55/317 |
| 2012/0174544 A1 * | 7/2012 | Tornblom | B04B 5/005 55/438 |
| 2012/0234168 A1 * | 9/2012 | Tofsland | B01D 50/002 95/268 |
| 2014/0059985 A1 * | 3/2014 | Janakiraman | B01D 45/08 55/459.4 |

* cited by examiner

OIL MIST FILTER

BACKGROUND OF THE INVENTION

1. Technical Field

The present invention relates to filtering apparatus, and more particularly to an oil mist filter which facilitates air to guide turbulent flow greatly.

2. Description of Related Art

A conventional purifying apparatus is applicable for CNC machines, petrochemical industry, pharmaceutical industry, paint spraying industry, and catering kitchen industry to filter oils, mists, smokes, or hazes.

The conventional purifying apparatus contains a flat filtration panel on which plural filtering layers are stacked, and each filtering layer has a plurality of mesh grids formed therein.

However, when a power assembly of air ventilation draws air, the flat filtration panel produces air resistance seriously, thus decreasing filtration.

The present invention has arisen to mitigate and/or obviate the afore-described disadvantages.

SUMMARY OF THE INVENTION

The primary objective of the present invention is to provide an oil mist filter which guides air by using each guiding portion effectively and enhances turbulent flow.

Further objective of the present invention is to provide an oil mist filter in which a filtration area of a filtering assembly is increased and air resistance is decreased to enhance filtration.

Another objective of the present invention is to provide an oil mist filter which facilitates air to guide turbulent flow greatly.

To obtain the above objective(s), an oil mist filter provided by the present invention contains: a top cover, a bottom cover, and a conical filtering assembly. The top cover includes a collection portion formed on a central position thereof and a plurality of guiding portions radially extending outward from the collection portion. The bottom cover is hollow and includes a through orifice defined on a central position thereof, and an outer diameter of the bottom cover is greater than the top cover. The filtering assembly is disposed between the top cover and the bottom cover. Thereby, oily substances from the top cover are guided by the plurality of guiding portions to flow through and to be filtered by the filtering assembly, and then the oily substances are guided out of the through orifice of the bottom cover.

The oil mist filter filters oily substances (such as oils, mists, smokes, or hazes) by using each guiding portion effectively, and air is guided smoothly via the through orifice, thus increasing flow capacity and decreasing pressure loss.

DETAILED DESCRIPTION OF THE PREFERRED EMBODIMENTS

Figure 1:
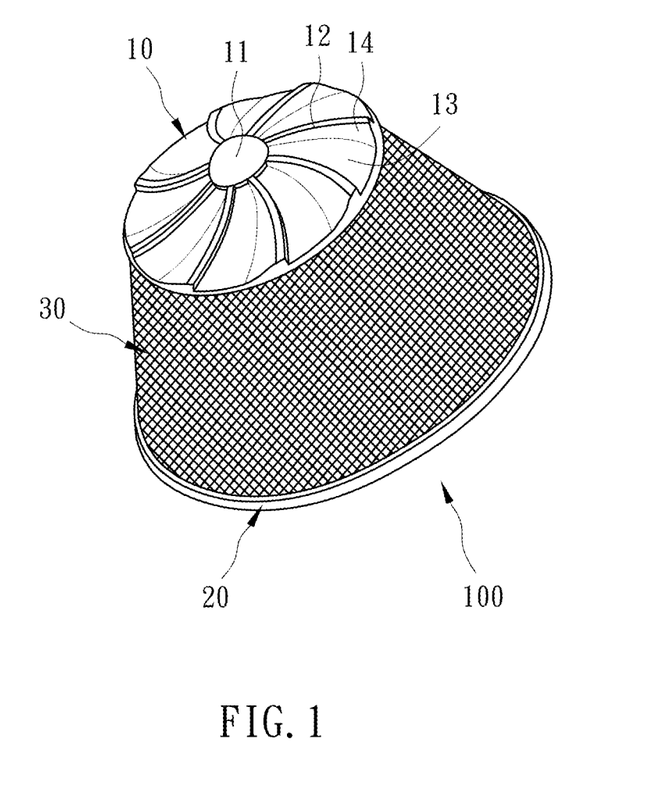
FIG. 1 is a perspective view showing the assembly of an oil mist filter according to a first embodiment of the present invention.
Figure 2:
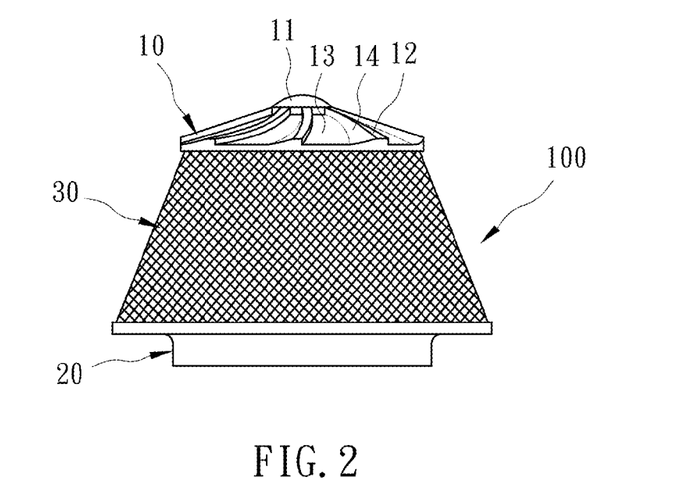
FIG. 2 is a side plan view showing the assembly of the oil mist filter according to the first embodiment of the present invention.
Figure 3:
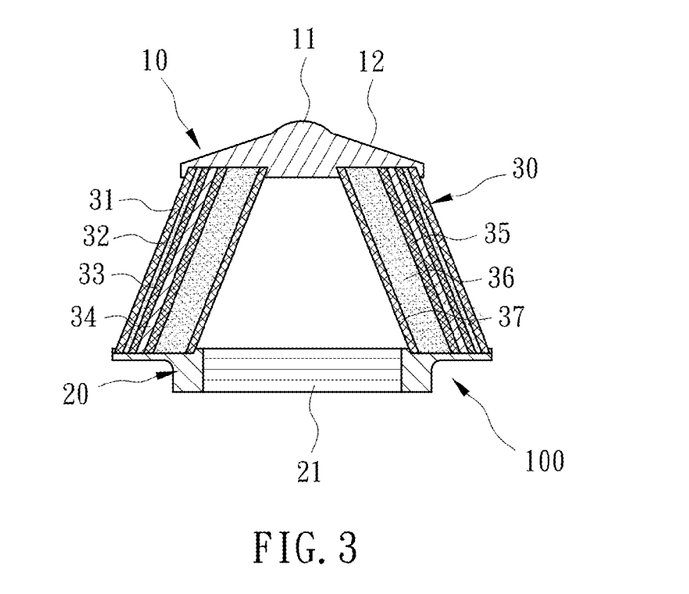
FIG. 3 is a cross sectional view showing the assembly of the oil mist filter according to the first embodiment of the present invention.
Figure 8:
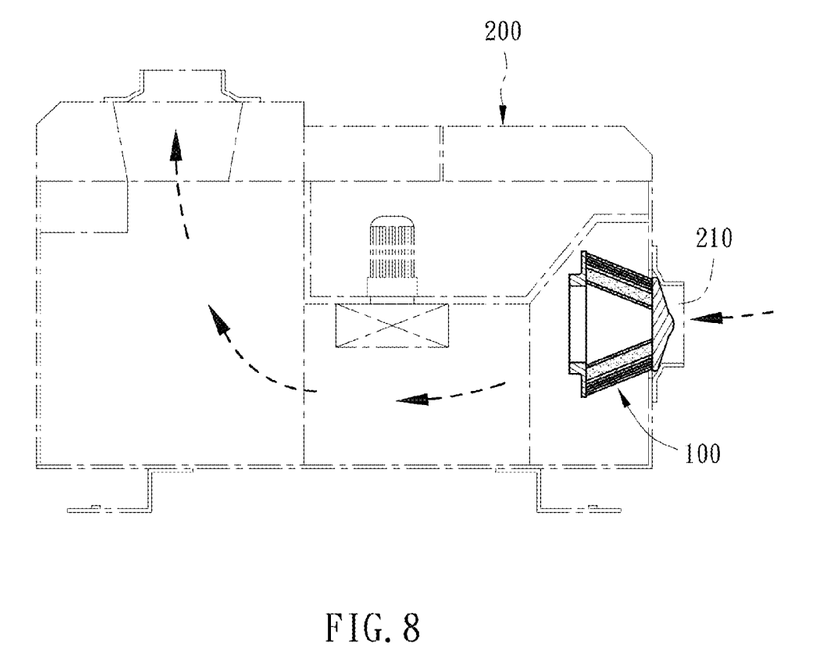
FIG. 8 is a cross sectional view showing the application of the oil mist filter according to the first embodiment of the present invention.

With reference to FIG. 8, an oil mist filter 100 according to a first embodiment of the present invention is fixed on an air intake 210 of an oil mist collector 200. Referring further to FIGS. 2 and 3, the oil mist filter 100 comprises a top cover 10, a bottom cover 20, and a conical filtering assembly 30.

As shown in FIGS. 2 and 3, the top cover 10 is in a cone shape, and the top cover 10 includes a collection portion 11 formed on a central position thereof and a plurality of guiding portions 12 radially extending outward from the collection portion 11. In this embodiment, the collection portion 11 of the top cover 10 is circular and projects upwardly, and each guiding portion 12 tilts downwardly from the collection portion 11, wherein between any two guiding portions 12 of the top cover 10 is defined a groove 13, and between one side of each guiding portion 12 and the groove 13 is formed an arcuate slope face 14, such that air flows on the top cover 10 smoothly. In this embodiment, an inclination angle of each guiding portion 12 is 70 degrees.

The bottom cover 20 is hollow and includes a through orifice 21 defined on a central position thereof, and an outer diameter of the bottom cover 20 is greater than the top cover 10.

Figure 5:
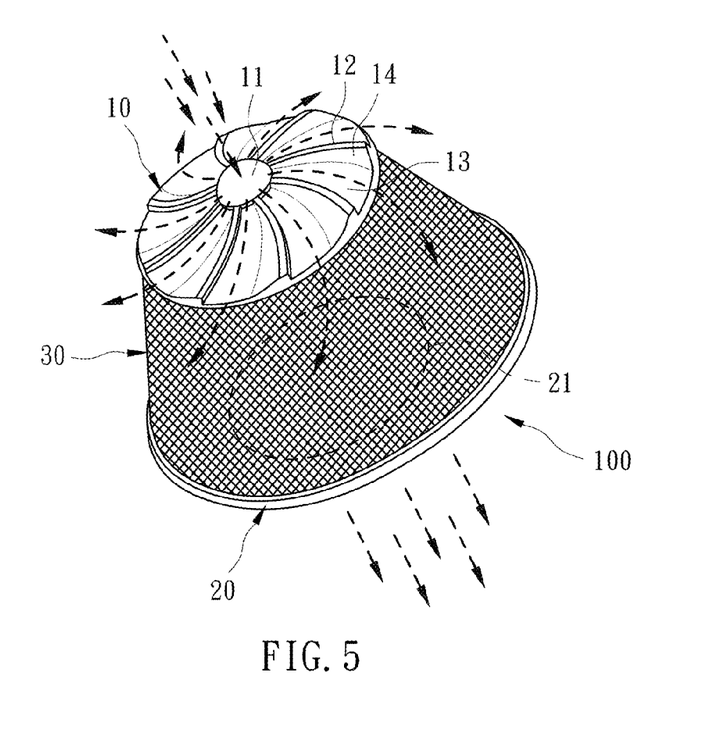
FIG. 5 is a perspective view showing the operation of the oil mist filter according to the first embodiment of the present invention.

As illustrated in FIGS. 3 and 5, the filtering assembly 30 is disposed between the top cover 10 and the bottom cover 20 to filter oily substances (such as oils, mists, smokes, or hazes) from the plurality of guiding portions 12 of the top cover 10, and then the oily substances are guided out of the through orifice 21 of the bottom cover 20. In this embodiment, an outer diameter of the through orifice 21 is greater than a radius of the bottom cover 20, hence the oil mist filter 100 causes high flow capacity and low pressure loss.

The filtering assembly 30 includes an external mesh 31, an air mesh 32, a deposition mesh 33, a connecting mesh 34, a layer mesh 35, an oil water separating layer 36, and an internal mesh 37. Each of the external mesh 31 and the internal mesh 37 is made of metal material and has plural rhombus mesh grids formed therein. The air mesh 32 has plural mesh grids intersected one another and made of a metal wire, the deposition mesh 33 has plural mesh grids intersected one another and made of a metal wire, wherein a diameter of each mesh grid of the air mesh 32 is less than a diameter of each mesh grid of the deposition mesh 33, and a size of each mesh grid of the air mesh 32 is less than a size of each mesh grid of the deposition mesh 33. The connecting mesh 34 has plural mesh grids obliquely arranged therein and made of metal material, and the layer mesh 35 has plural mesh grids intersected one another, wherein a size of each mesh grid of the layer mesh 35 is less than those of the external mesh 31 and the internal mesh 37. In addition, each of the layer mesh 35, the external mesh 31 and the internal mesh 37 is made of stainless steel, and the oil water separating layer 36 is made of fiber material.

Figure 6:
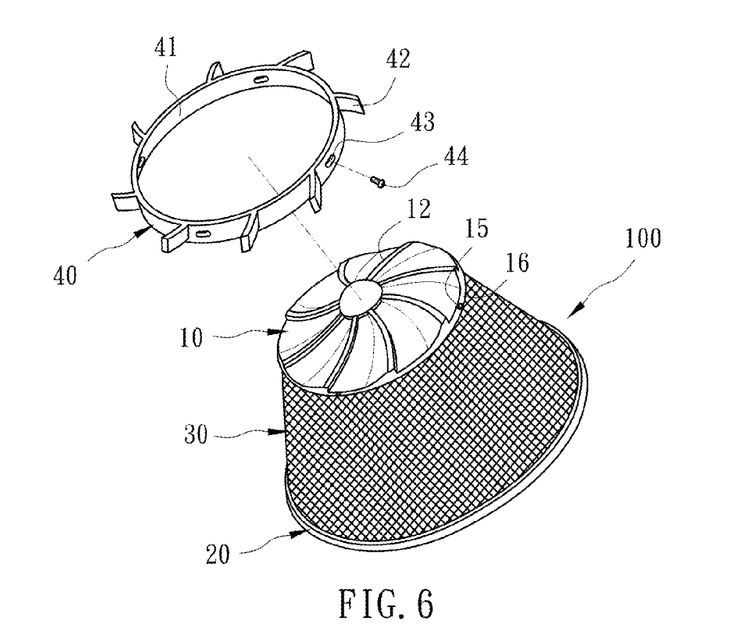
FIG. 6 is a perspective view showing the exploded components of an oil mist filter according to a second embodiment of the present invention.
Figure 7:
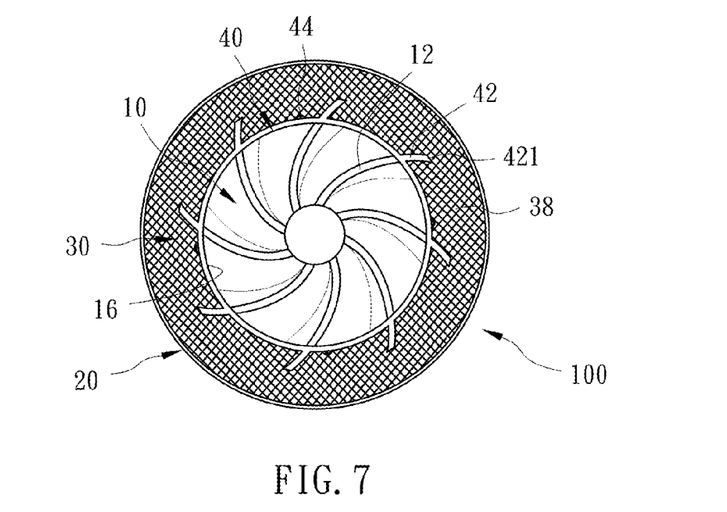
FIG. 7 is a top plan view showing the assembly of the oil mist filter according to the second embodiment of the present invention.

As shown in FIGS. 6 and 7, an oil mist filter 100 according to a second embodiment of the present invention comprises a top cover 10, a bottom cover 20, a filtering assembly 30, and a guide loop 40. Due to a structure of the top cover 10, the bottom cover 20, and the filtering assembly 30 of the second embodiment is identical to that of the first embodiment, its remarks are omitted.

The guide loop 40 is mounted on an outer peripheral side 16 of the top cover 10 and includes a body 41 and plural guiding ribs 42 extending outwardly from the body 41, wherein each guiding rib 42 is in connection with a distal end of each guiding portion 12 of the top cover 10, such that a distal segment 421 of each guiding rib 42 is located above an intermediate section 38 of the filtering assembly 30. The guide loop 40 further includes a plurality of holes 43 defined on the body 41, and the top cover 10 includes plural apertures 15 arranged on the outer peripheral side 16 of the top cover 10 and corresponding to the plurality of holes 43, such that plural locking elements 44 are inserted through the plurality of holes 43 of the body 41 to lock with the plural apertures 15 of the top cover 10, thus fixing the guide loop 40 on the top cover 10.

The guide loop 40 is fixed on the top cover 10 by connecting each guiding rib 42 with the distal end of each guiding portion 12, such that a length of each guiding portion 12 is extended, and each guiding rib 42 extends above the filtering assembly 30, thus increasing flowing speed and filtration and decreasing air resistance.

Figure 4:
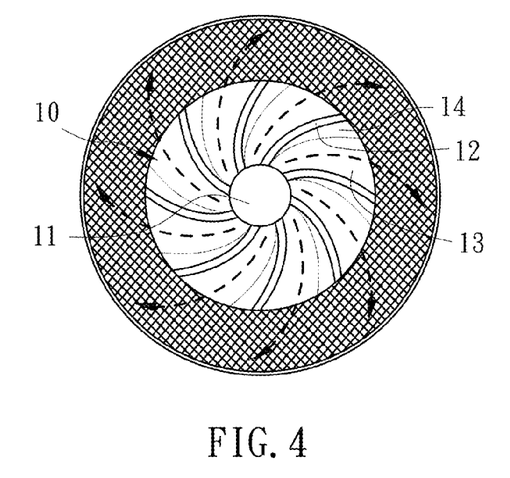
FIG. 4 is a top plan view showing the operation of the oil mist filter according to the first embodiment of the present invention.

With reference to FIGS. 4 and 5, the oil mist filter 100 filters the oily substances by using each guiding portion 12 effectively, and air is guided smoothly via the through orifice 21, thus increasing the flow capacity and decreasing pressure loss. Preferably, the filtering assembly 30 is formed in a cylinder shape and includes the external mesh 31, the air mesh 32, the deposition mesh 33, the connecting mesh 34, the layer mesh 35, the oil water separating layer 36, and the internal mesh 37, hence the oily substances are filtered efficiently to eliminate harmful aerosols up to 0.03 micron. Furthermore, the layer mesh 35, the external mesh 31 and the internal mesh 37 of the filtering assembly 30 are made of the stainless steel to resist against high temperature and acid corrosion. Preferably, a filtration area of the filtering assembly 30 is increased to enhance filtration.

Accordingly, the oil mist filter of the present invention has excellent flow capacity, low pressure loss, multi-layer filtration, large filtration area, low air resistance, and high temperature and corrosion resistances. The oil mist filter of the present invention is applicable for CNC machines, petrochemical industry, pharmaceutical industry, paint spraying industry, and catering kitchen industry.

Figure 9:
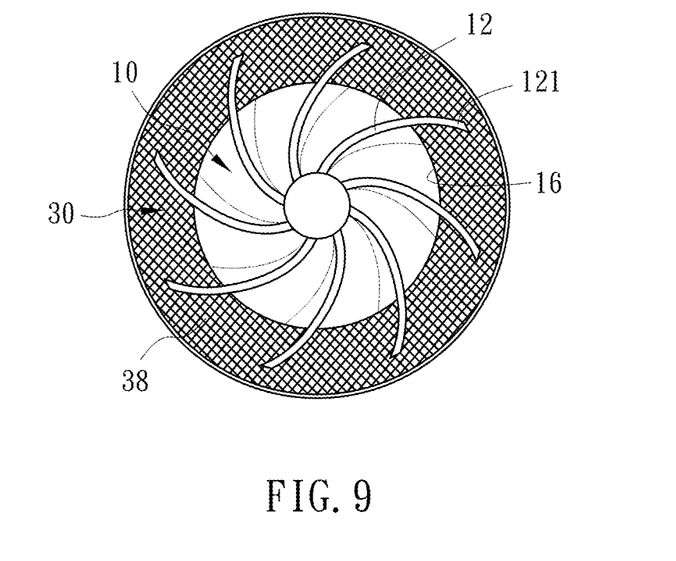
FIG. 9 is another top plan view showing the assembly of the oil mist filter according to the second embodiment of the present invention.

It is to be noted that the oil mist filter 100 of the second embodiment comprises the guide loop 40 to prolong the length of each guiding portion 12, as shown in FIGS. 6 and 7. With reference to FIG. 9, the length of each guiding portion 12 is extended to the outer peripheral side 16 of the top cover 10, such that an external edge 121 of each guiding portion 12 is located above the intermediate section 38 of the filtering assembly 30, thus prolonging each guiding portion 12 equivalently.

Referring to FIGS. 6 and 7, the guide loop 40 is fixed on the top cover 10 by ways of plural screw bolts. Alternatively, tenons for matching with plural retaining projections are employed to fix the guide loop 40 on the top cover 10.

Figure 10:
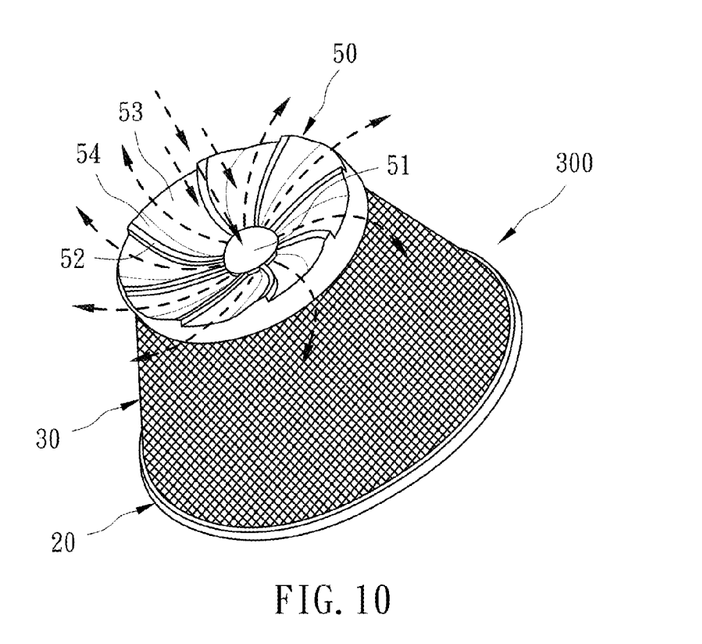
FIG. 10 is a perspective view showing the assembly of an oil mist filter according to a third embodiment of the present invention.
Figure 11:
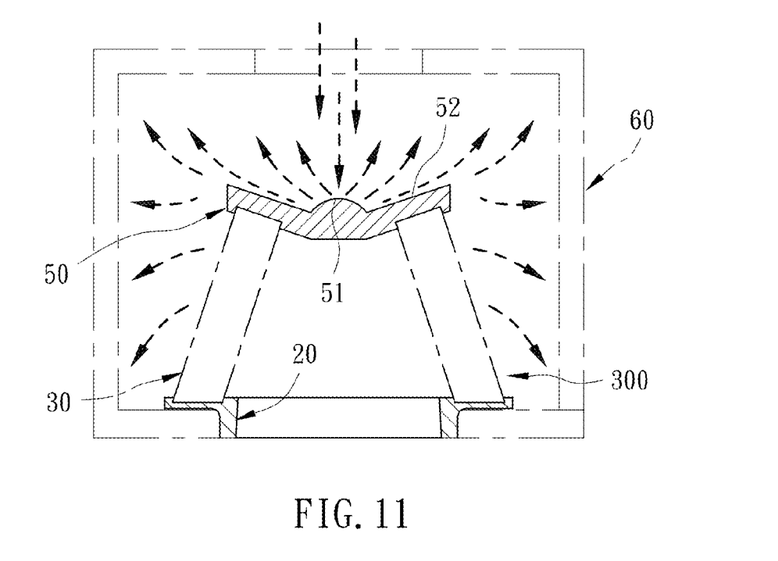
FIG. 11 is a cross sectional view showing the assembly of a part of the oil mist filter according to the third embodiment of the present invention.

As shown in FIGS. 10 and 11, an oil mist filter 300 according to a third embodiment from comprises a top cover 50, a bottom cover 20, and a filtering assembly 30.

A difference of the oil mist filter 300 from that of the first embodiment comprises: the top cover 50 in a concaved disc shape, wherein the top cover 50 includes a collection portion 51 formed on a central position thereof and a plurality of guiding portions 52 radially extending outward from the collection portion 51. In this embodiment, the collection portion 51 of the top cover 50 is circular and is concaved downwardly, and each guiding portion 52 tilts upwardly from the collection portion 51, wherein between any two guiding portions 52 of the top cover 50 is defined a groove 53, and between one side of each guiding portion 52 and the groove 53 is formed an arcuate slope face 54, such that air flows on the top cover 50 smoothly.

In operation, the oil mist filter 300 is mounted in a filtration cylinder 60, so when air flows downwardly to the collection portion 51 from the filtration cylinder 60 via the plurality of guiding portions 52, it is stopped by the collection portion 51 to spray upwardly back to the filtration cylinder 60, thus cleaning the filtration cylinder 60 effectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil mist filter being fixed on an air intake of an oil mist collector and comprising:
   a top cover including a collection portion formed on a central position thereof and a plurality of guiding portions radially extending outward from the collection portion;
   a bottom cover being hollow and including a through orifice defined on a central position thereof, and an outer diameter of the bottom cover being greater than the top cover;
   a conical filtering assembly disposed between the top cover and the bottom cover;
   a guide loop mounted on an outer peripheral side of the top cover, wherein the guide loop includes a body and a plurality guiding ribs extending outwardly from the body, and each of the plurality of guiding ribs is in connection with a distal end of each of the plurality of guiding portions of the top cover, such that a distal segment of said each guiding rib is located above an intermediate section of the conical filtering assembly;
   wherein the guide loop further includes a plurality of holes defined on the body, and the top cover includes a plurality of apertures arranged on the outer peripheral side of the top cover and corresponding to the plurality of holes, such that a plurality of locking elements are inserted through the plurality of holes of the body to lock with the plurality of apertures of the top cover, thus fixing the guide loop on the top cover;

thereby oily substances from the top cover are guided by the plurality of guiding portions to flow through and to be filtered by the conical filtering assembly, and then the oily substances are guided out of the through orifice of the bottom cover.

2. The oil mist filter as claimed in claim 1, wherein between any two of the plurality of guiding portions of the top cover is defined a groove, and between one side of said each guiding portion and the groove is formed an arcuate slope face.

3. The oil mist filter as claimed in claim 1, wherein the collection portion of the top cover is circular and projects upwardly, said each guiding portion tilts downwardly from the collection portion, and an inclination angle of said each guiding portion is 70 degrees.

4. The oil mist filter as claimed in claim 1, wherein a length of said each guiding portion of the top cover is extended to the outer peripheral side of the top cover, such that an external edge of said each guiding portion is located above an intermediate section of the conical filtering assembly.

5. The oil mist filter as claimed in claim 1, wherein the conical filtering assembly includes an external mesh, an air mesh, a deposition mesh, a connecting mesh, a layer mesh, an oil water separating layer, and an internal mesh.

6. The oil mist filter as claimed in claim 5, wherein each of the external mesh and the internal mesh is made of metal material and has a plurality of rhombus mesh grids formed therein.

7. The oil mist filter as claimed in claim 5, wherein the oil water separating layer is made of fiber material.

8. The oil mist filter as claimed in claim 5, wherein the air mesh has a plurality of mesh grids intersecting one another and made of a metal wire, the deposition mesh has a plurality of mesh grids intersecting one another and made of a metal wire, wherein a diameter of each of the plurality of mesh grids of the air mesh is less than a diameter of each of the plurality of mesh grids of the deposition mesh, and a size of said each mesh grid of the air mesh is less than a size of said each mesh grid of the deposition mesh.

9. The oil mist filter as claimed in claim 1, wherein the top cover is in a cone shape.

10. An oil mist filter being fixed on an air intake of an oil mist collector and comprising:

a top cover including a collection portion formed on a central position thereof and a plurality of guiding portions radially extending outward from the collection portion;

a bottom cover being hollow and including a through orifice defined on a central position thereof, and an outer diameter of the bottom cover being greater than the top cover;

a conical filtering assembly disposed between the top cover and the bottom cover;

a guide loop mounted on an outer peripheral side of the top cover, wherein the guide loop includes a body and a plurality guiding ribs extending outwardly from the body, and each of the plurality of guiding ribs is in connection with a distal end of each of the plurality of guiding portions of the top cover, such that a distal segment of said each guiding rib is located above an intermediate section of the conical filtering assembly;

wherein the guide loop is configured to prolong a length of said each guiding portion so that the length of said each guiding portion is extended to the outer peripheral side of the top cover, and an external edge of said each guiding portion is located above the intermediate section of the conical filtering assembly.

11. The oil mist filter as claimed in claim 10, wherein between any two of the plurality of guiding portions of the top cover is defined a groove, and between one side of said each guiding portion and the groove is formed an arcuate slope face.

12. The oil mist filter as claimed in claim 10, wherein the collection portion of the top cover is circular and projects upwardly, said each guiding portion tilts downwardly from the collection portion, and an inclination angle of said each guiding portion is 70 degrees.

13. The oil mist filter as claimed in claim 10, wherein a length of said each guiding portion of the top cover is extended to the outer peripheral side of the top cover, such that an external edge of said each guiding portion is located above an intermediate section of the conical filtering assembly.

14. The oil mist filter as claimed in claim 10, wherein the conical filtering assembly includes an external mesh, an air mesh, a deposition mesh, a connecting mesh, a layer mesh, an oil water separating layer, and an internal mesh.

15. The oil mist filter as claimed in claim 14, wherein each of the external mesh and the internal mesh is made of metal material and has a plurality of rhombus mesh grids formed therein.

16. The oil mist filter as claimed in claim 14, wherein the oil water separating layer is made of fiber material.

17. The oil mist filter as claimed in claim 14, wherein the air mesh has a plurality of mesh grids intersecting one another and made of a metal wire, the deposition mesh has a plurality of mesh grids intersecting one another and made of a metal wire, wherein a diameter of each of the plurality of mesh grids of the air mesh is less than a diameter of each of the plurality of mesh grids of the deposition mesh, and a size of said each mesh grid of the air mesh is less than a size of said each mesh grid of the deposition mesh.

* * * * *